(12) United States Patent
Trouw et al.

(10) Patent No.: US 11,897,282 B2
(45) Date of Patent: Feb. 13, 2024

(54) BICYCLE RIM AND WHEEL

(71) Applicant: SRAM, LLC, Chicago, IL (US)

(72) Inventors: Ruan Trouw, Mooresville, IN (US);
Michael Hall, Indianapolis, IN (US);
Aaron Packard, Brownsburg, IN (US)

(73) Assignee: SRAM, LLC, Chicago, IL (US)

( * ) Notice: Subject to any disclaimer, the term of this patent is extended or adjusted under 35 U.S.C. 154(b) by 464 days.

(21) Appl. No.: 16/398,620

(22) Filed: Apr. 30, 2019

(65) Prior Publication Data

US 2019/0344615 A1    Nov. 14, 2019

Related U.S. Application Data

(60) Provisional application No. 62/669,101, filed on May 9, 2018.

(51) Int. Cl.
| | | |
|---|---|---|
| *B60B 21/02* | (2006.01) | |
| *B60B 21/06* | (2006.01) | |
| *B60B 21/10* | (2006.01) | |
| *B60B 5/02* | (2006.01) | |
| *B60B 1/00* | (2006.01) | |

(52) U.S. Cl.
CPC .............. *B60B 21/02* (2013.01); *B60B 1/003* (2013.01); *B60B 5/02* (2013.01); *B60B 21/062* (2013.01); *B60B 21/10* (2013.01); *B60B 2360/3416* (2013.01); *B60B 2360/3418* (2013.01); *B60B 2360/36* (2013.01)

(58) Field of Classification Search
CPC ....... B60B 1/003; B60B 5/02; B60B 2360/36; B60B 2360/3416
See application file for complete search history.

(56) References Cited

U.S. PATENT DOCUMENTS

| | | |
|---|---|---|
| 2,368,254 A | 1/1945 | Lyon |
| 3,392,772 A | 7/1968 | Powers |
| 3,947,070 A | 3/1976 | Brillando |
| 4,030,754 A | 6/1977 | Merlette |
| 4,164,133 A | 8/1979 | Damman |
| 4,741,578 A | 5/1988 | Viellard |
| 4,844,552 A * | 7/1989 | Tsygankov ............. B60B 3/082 301/64.702 |
| 5,540,485 A | 7/1996 | Enders |

(Continued)

FOREIGN PATENT DOCUMENTS

| | | |
|---|---|---|
| CN | 101028784 A | 9/2007 |
| CN | 101134422 | 3/2008 |

(Continued)

OTHER PUBLICATIONS

Carbon Fiber Characteristics, https://www.christinedemerchant.com/carboncharacteristics.html, accessed Aug. 18, 2021 (Sep. 10, 2015).*

(Continued)

*Primary Examiner* — Scott A Browne

(57) ABSTRACT

A bicycle rim and/or wheel are provided. The bicycle rim and/or wheel includes a single wall formed into the bicycle rim. The wall is formed of composite material having a spoke attachment portion and a tire attachment portion formed therein. The composite material may include at least two different materials, or fibers used as reinforcement material, forming layers of a thickness of the rim.

19 Claims, 11 Drawing Sheets

(56) References Cited

U.S. PATENT DOCUMENTS

| | | | |
|---|---|---|---|
| 5,820,709 A | 10/1998 | Matsuda | |
| 5,975,645 A | 11/1999 | Sargent | |
| 5,988,764 A | 11/1999 | Deetz | |
| 6,145,936 A | 11/2000 | Alberti et al. | |
| 6,347,839 B1 | 2/2002 | Lew et al. | |
| 6,425,641 B1 | 7/2002 | Herting | |
| 6,761,847 B2 | 7/2004 | Meggiolan | |
| 7,858,011 B2 * | 12/2010 | Reuteler | B60B 21/04 |
| | | | 264/258 |
| 8,162,408 B2 | 4/2012 | Yang | |
| 8,905,491 B2 | 12/2014 | Koshiyama | |
| 9,302,538 B2 | 4/2016 | Smart | |
| 2005/0062338 A1 * | 3/2005 | Vernet | B60B 5/02 |
| | | | 301/95.102 |
| 2006/0071540 A1 | 4/2006 | Koziatek | |
| 2008/0265658 A1 | 10/2008 | Reuteler | |
| 2008/0315676 A1 | 12/2008 | Cobb | |
| 2013/0169029 A1 * | 7/2013 | Chen | B60B 21/062 |
| | | | 301/95.104 |
| 2014/0292061 A1 | 10/2014 | Lew | |
| 2016/0159141 A1 | 6/2016 | Satterthwaite et al. | |
| 2017/0080749 A1 * | 3/2017 | Scruggs | B60C 19/12 |

FOREIGN PATENT DOCUMENTS

| | | |
|---|---|---|
| CN | 101489806 A | 7/2009 |
| CN | 102292221 | 12/2011 |
| CN | 102458973 A | 5/2012 |
| CN | 102602240 | 7/2012 |
| CN | 103302873 | 9/2013 |
| CN | 103974834 A | 8/2014 |
| CN | 104175791 | 1/2017 |
| EP | 1231077 | 5/2006 |
| EP | 2098382 | 9/2009 |
| EP | 2020306 | 6/2011 |
| EP | 2626218 | 8/2013 |
| TW | 200900273 | 1/2009 |
| TW | 201318888 A | 5/2013 |
| TW | M459128 U | 8/2013 |
| TW | 201501965 A | 1/2015 |
| TW | M529610 | 10/2016 |
| TW | 201700313 A | 1/2017 |
| WO | 0226510 | 4/2002 |

OTHER PUBLICATIONS

First Look: Bouwmeester Composites Cabon Wheels, Website: First Look: Bouwmeester Composites Carbon Wheels—Mountain Bike Feature—Vital MTB, Dec. 27, 2014, Last Checked Sep. 11, 2023.

Krueger, Long Term Review: Bouwmeester Tammar 4.8 Carbon Fiber Wide Enduro Wheels, May 26, 2015, Website: https://bikerumor.com/long-term-review-bouwmeester-tammar-4-8-carbon-fiber-wide-enduro-wheels/, Last Checked Sep. 11, 2023.

* cited by examiner

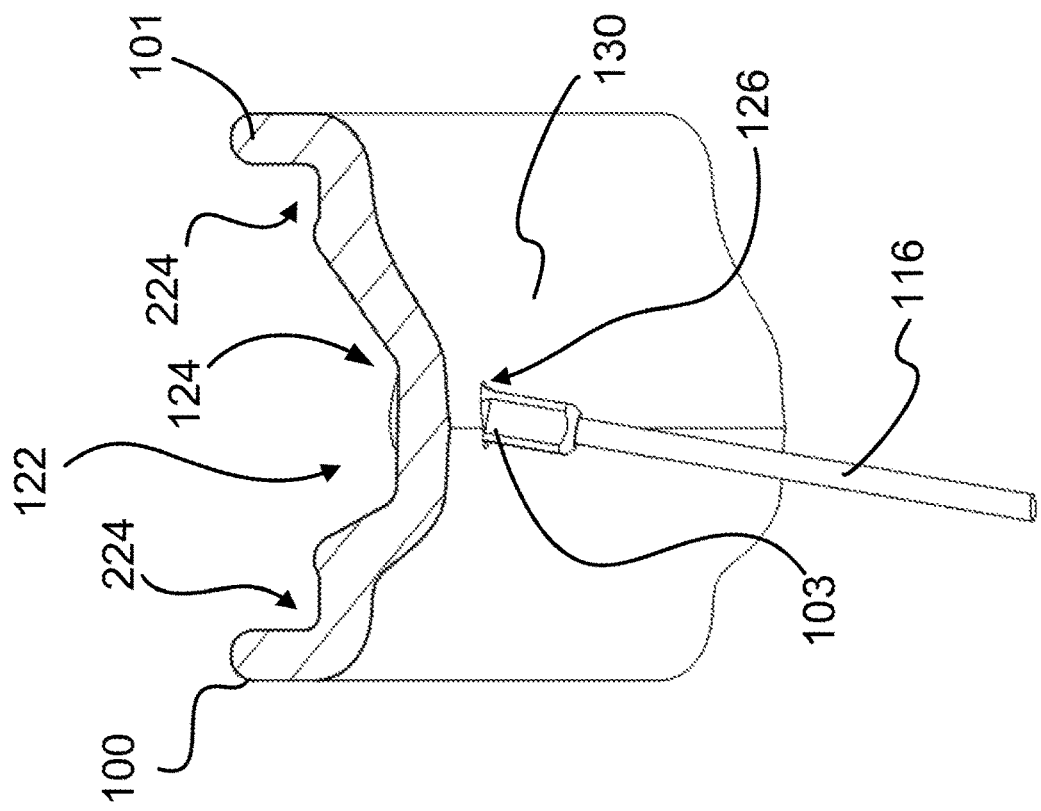
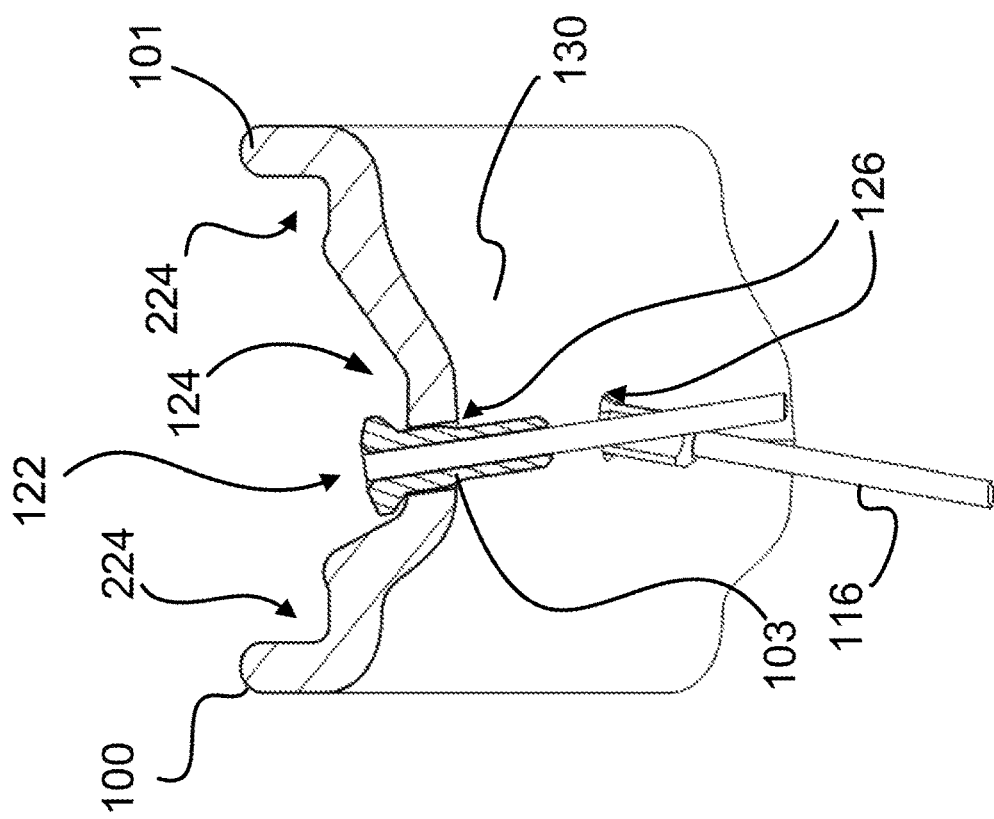

BICYCLE RIM AND WHEEL

The present application claims priority to Provisional U.S. Patent Application No. 62/669,101, filed May 9, 2018, the contents of which are incorporated herein in their entirety.

FIELD OF THE INVENTION

This invention generally relates to bicycle rims and wheels, and specifically relates to a bicycle rim and wheel including composite materials formed into a wall shape with spoke attachment features and tire attachment features formed therein.

BACKGROUND

Bicycle rims for bicycle wheels have been traditionally formed of metal materials, such as aluminum and/or steel based materials. Bicycle rims have also been formed of composite materials, which may be constructed to provide weight benefits of a lighter rim for riders. For example, bicycle rims have been formed of fiber reinforced plastics or resins, as well as other composite constructions. Composite materials, particularly fiber reinforced plastics or resins have different material properties than traditional metal materials. To achieve traditional rim strength levels of rims formed of metal materials, composite material rims are often formed of a hollow, or box, construction resulting in a strong and stiff rim construction.

Strength values achieved with hollow composite construction rims are acceptable, but the resulting hollow rim structure can be very stiff resulting in damage when used in aggressive environments, such as mountain biking and other off-road bicycling activities. There is a need for a bicycle rim having the weight benefits of composite materials, and a construction increasing a strength and/or resilience of the rim to provide for performance in aggressive bicycling environments.

SUMMARY

In an embodiment, a bicycle rim is provided. The bicycle rim includes a single wall formed into the bicycle rim, the wall formed of composite material having a spoke attachment portion and a tire attachment portion formed therein, wherein the composite material comprises at least two different fibers used as reinforcement material forming layers of a thickness of the rim.

In an embodiment, a bicycle rim is provided. The bicycle rim includes a wall formed into the bicycle rim, the wall formed of composite material having a spoke attachment portion and a tire attachment portion formed therein, the composite material formed of layers providing a thickness of the rim, wherein the composite material includes a layer of the interior of the thickness of the rim that is formed of a different material than both layers of the thickness adjacent the interior layer. The composite material may include a carbon fiber. The carbon fiber may be disposed in the adjacent layers. In an embodiment, the wall is formed absent metallic materials.

In an embodiment, a bicycle wheel is provided. The bicycle wheel includes a rim formed from composite materials, the rim formed as a single wall having a spoke attachment portion and a tire attachment portion, wherein the composite material comprises at least two different fibers used as a reinforcement material forming layers of the thickness of the rim. The bicycle wheel also includes a central hub for rotational attachment to a bicycle frame. The bicycle wheel also includes a plurality of spokes extending from the tire attachment portion of the rim and attached to the hub.

BRIEF DESCRIPTION OF DRAWINGS

FIGS. 5A-5B illustrate different front sectional views of the section of the wheel of FIG. 2;

Other aspects and advantages of the embodiments disclosed herein will become apparent upon consideration of the following detailed description, wherein similar or identical structures have similar reference numerals.

DETAILED DESCRIPTION

Figure 1:
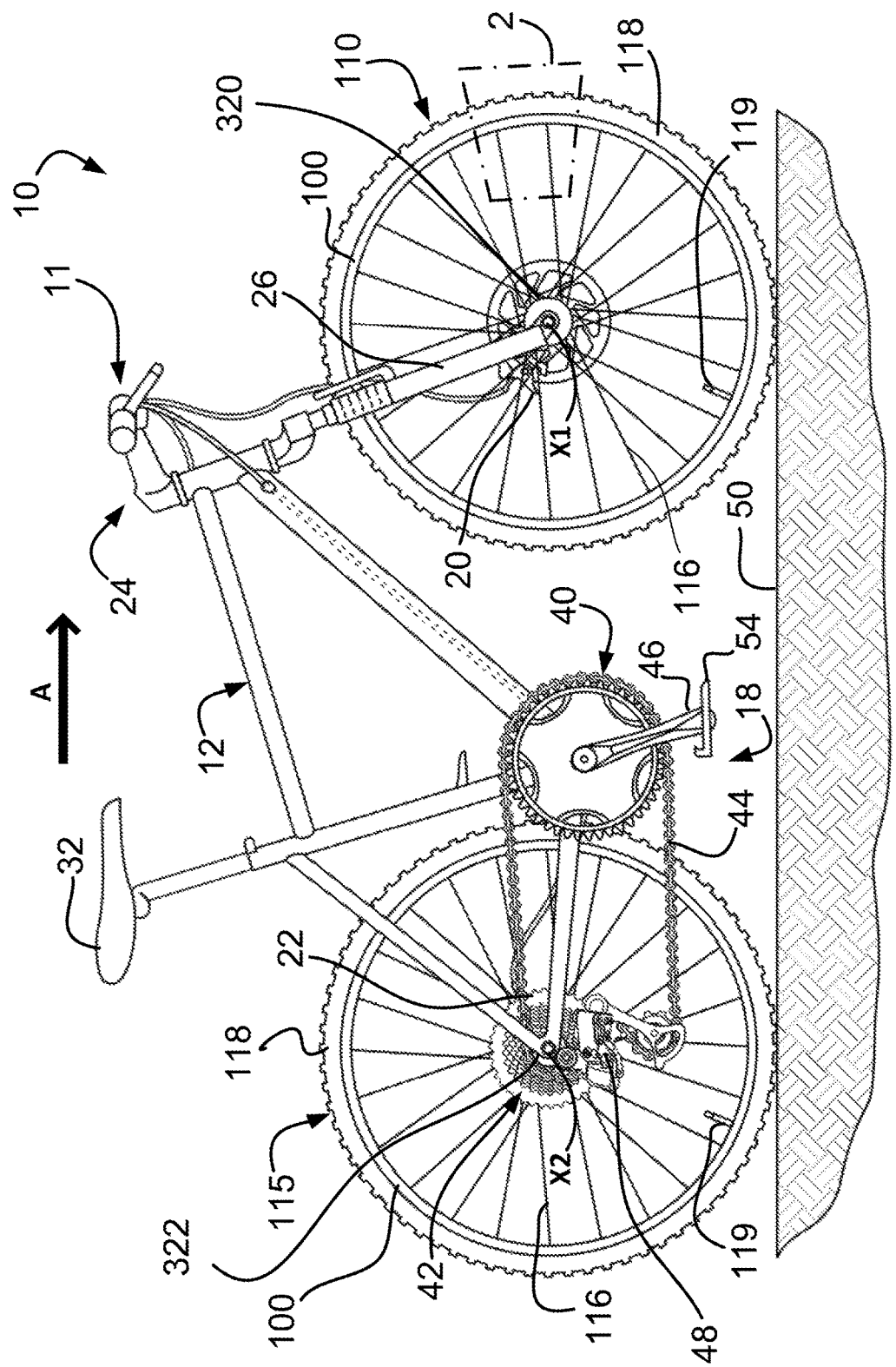
FIG. 1 is a right side elevational view of a bicycle according to one embodiment.

A bicycle rim for a bicycle wheel may be formed of a wall of composite material shaped to include both a tire attachment portion and a spoke attachment portion. The wall of composite material may be formed as a single-wall construction including minimal to no designed strengthening hollow spaces internally. The single-wall construction may be formed of composite strengthening materials, such as fibers or fabrics formed of fibers or other materials. In some applications the strengthening materials may be positioned as layers through a thickness of the single-wall construction. Various types of carbon fibers are used as strengthening materials. Other materials and material fibers may also be used. The composite strengthening material may be impregnated with a matrix material, such as a plastic or resin, and solidified through a curing or other process to form a rim structure. In an embodiment, multiple strengthening or reinforcement materials and/or matrix materials may be used to provide specific strength values or other characteristics to the rim construction.

The rim may be formed having an asymmetric cross sectional profile. For example, the center of a spoke attachment recess may not be aligned with a center of an overall width of the rim. This asymmetry may be provided to address an asymmetric spoke pattern applied to the rim, resulting in different spoke tension angles, and other considerations. For example, one side of a rim may extend wider from the center of the spoke attachment recess than the other side of the rim. This configuration may be used to address a dished wheel spoke pattern existent on wheels having wheel hubs configured to include multiple sprockets for a rear drive of a bicycle drivetrain. Dished wheel spoke patterns may also be used on front wheels to compensate for a disk of a braking system attached to the front wheel hub. The asymmetric rim configuration includes other geometrical, structural, and construction considerations, as are described herein. For example, a first side of a rim may have a different stiffness than a second side of the rim.

A single-wall rim of composite construction can provide an increase in strength over hollow composite construction rims. For example, single-wall rims may be formed to be stiff enough to maintain stability in normal riding conditions, compliant enough to deform due to an impact loading event of an external structure in aggressive riding environments, and resilient enough to return to an original structure after the impact loading situation or event. In an embodiment, the single-wall forms a consistent shape throughout the entirety of the circumference of the rim.

In an embodiment, the laminate and/or plies from which the rim is made are altered by changing the composite layers. The layers are changed such that an asymmetric width rim has differing laminates and/or plies between a long axial width side of a rim and a short axial width side of the rim. Each laminate and/or ply may have a particular set of properties, which may be distinct from other laminates and/or plies in the rim. The properties of the two sides of the rim are altered so that once the rim is built into a wheel system, the radial and lateral stiffness of the two rim sides are closer to being equal, despite geometric dissimilarities between the sides. Rims constructed with these techniques may have beneficial characteristics. For example, cornering left and right becomes similar, giving the rider more control over the bicycle. Also, during wheel impacts, the impact load is shared more equally through both sides of the rim, resulting in a more durable rim. In addition, gains from rim constructions resulting in higher durability allow for the manufacturing of a lighter rim with the same strength as a rim with uneven properties between the long and short sides.

Embodiments of the invention will herein be described with reference to various figures. It will be understood that the figures and descriptions set out herein are provided for illustration only and do not limit the invention to only disclosed embodiments. For example, the terms "first" and "second," "front" and "rear," or "left" and "right" are used in the detailed description for the sake of clarity and not as terms of limitation. Moreover, the terms refer to bicycle mechanisms conventionally mounted to a bicycle and with the bicycle oriented and used in a standard fashion unless otherwise indicated.

FIG. 1 generally illustrates a bicycle 10 of an off-road or mountain-type configuration including a drive arrangement 18. The bicycle 10 includes a frame 12 and front and rear wheels 110, 115 rotatably attached to the frame 12. A front brake 20 is provided for braking the front wheel 14 and a rear brake 22 is provided for braking the rear wheel 16. Each of the front and rear wheels 110, 115 includes a tire 13 attached to a rim 100, where the tire 13 is configured to engage the riding surface 50. A handlebar assembly 24 is provided for steering the front wheel 14. The direction of arrow "A" indicates a front and/or forward orientation of the bicycle 10. As such, a forward direction of movement of the bicycle 10 corresponds to the direction A.

Other configurations of the bicycle 10 are contemplated. For example, the bicycle 10 may have a road-type configuration. Potential differences between bicycles of various configurations include those between mountain and road-type bicycles. For example, FIG. 1 depicts the handlebar assembly 24 in a flat-type configuration, whereas a road-type example may have a drop-type configuration of the handlebar assembly 24. A road-type configuration may also include various other features, such as aerodynamic features.

FIG. 1 depicts features often found on off-road or mountain-type bicycles. For example, the front wheel 110 is attached to the frame 12 through a front suspension 26. The front suspension 26 may be of a suspension fork configuration as shown. The rear wheel 115 may be attached to the frame 12 through a rear suspension 28. The front and/or rear suspension 26, 28 may include a combination of springs, dampers, and/or linkages to achieve desired control of the front and rear wheel 110, 115. The bicycle 10 also includes a seating component, or saddle 32. The adjustable seating component 30 may include a saddle 32 attached to a seat post upper 36 through a seat post head 34. The seat post upper 36 is configured to move relative to a seat post lower 38, which is fixed to a seat tube 39 of the frame 12.

In the embodiment illustrated in FIG. 1 the chain 44 is configured for a multi-gear external drive arrangement and may be moved between individual sprockets of the rear cassette 42 using a gear changer, such as a derailleur 48. The gear changer 48 may be operated using any technique. For example, the gear change may be electrically operated, mechanically operated, hydraulically operated, or any combination thereof, or operated using other techniques. Other drive arrangements may also be used. For example, single gearing or multiple gearing internal front or wheel based hub drive arrangements may also be used.

As can be seen in FIG. 1, the front and/or rear wheel 110, 115 of the bicycle 10 include a tire 118 or tire assembly, attached to a radially outer tire engaging portion of the rim 100. A plurality of spokes 116 are attached directly to the rim 100 at a radially inner spoke engaging portion of the rim 100. The spokes 116 extend from the rim 100 and attach to a central hub 320 or 322. The front wheel 110 may have a front wheel hub 120 that is different from a rear wheel hub 322 of the rear wheel 115. The spokes 116 are maintained under tension between the rim 100 and the hub 320 or 322 to provide the wheel 110 or 115 an operational rigidity for use on the bicycle 10. The hub 320 or 322 is configured for rotational attachment to the bicycle frame 12 about axes of rotation X1, X2 of the rims 100 and wheels 110, 115. The rim 100 of the wheel 110 or 115 is formed as an advanced composite structure having a single-wall forming both tire attachment portions and rim attachment portions of the rim 100.

The single-wall composite structure provides a sufficient strength for aggressive riding in rough terrains. This strength is provided at least in part due to a compliant nature of the single-wall structure which is configured to be rigid enough for control and drive of the bicycle, but compliant so as to moderately deform due to impact loading imparted by the terrain. The composite material construction further provides the elasticity to return to the original intended shape of the wheel 110 or 115 after impact loading.

The rim 100 is configured for attachment to a tire 118 and/or a tire assembly. The tire and/or tire assembly includes at least a tire configured for attachment to the rim 100 and tractive interaction with the riding surface 50. A tire may also include a resilient structure, such as a pneumatic chamber defined either by the tire's interface with the rim 100, or an inner-tube. A tire using a pneumatic chamber may include a control valve 119 configured to control the input and/or output of air into the pneumatic chamber. The rim 100 may be configured to facilitate the use of such a control valve 119. For example, the rim may include a hole or vacancy configured to allow the passage of the control valve 119 therethrough. As will be described further below, the tire engaging portion of the rim 100 is configured for attachment to tires using clincher tire attachment configurations for tires including beaded interlock attachments. Other configurations of the tire engaging portion may also be provided to allow for the use of other types of tires on the rim 100. For example, tubeless tires including beaded interlock attachment types may be used.

Figure 2:
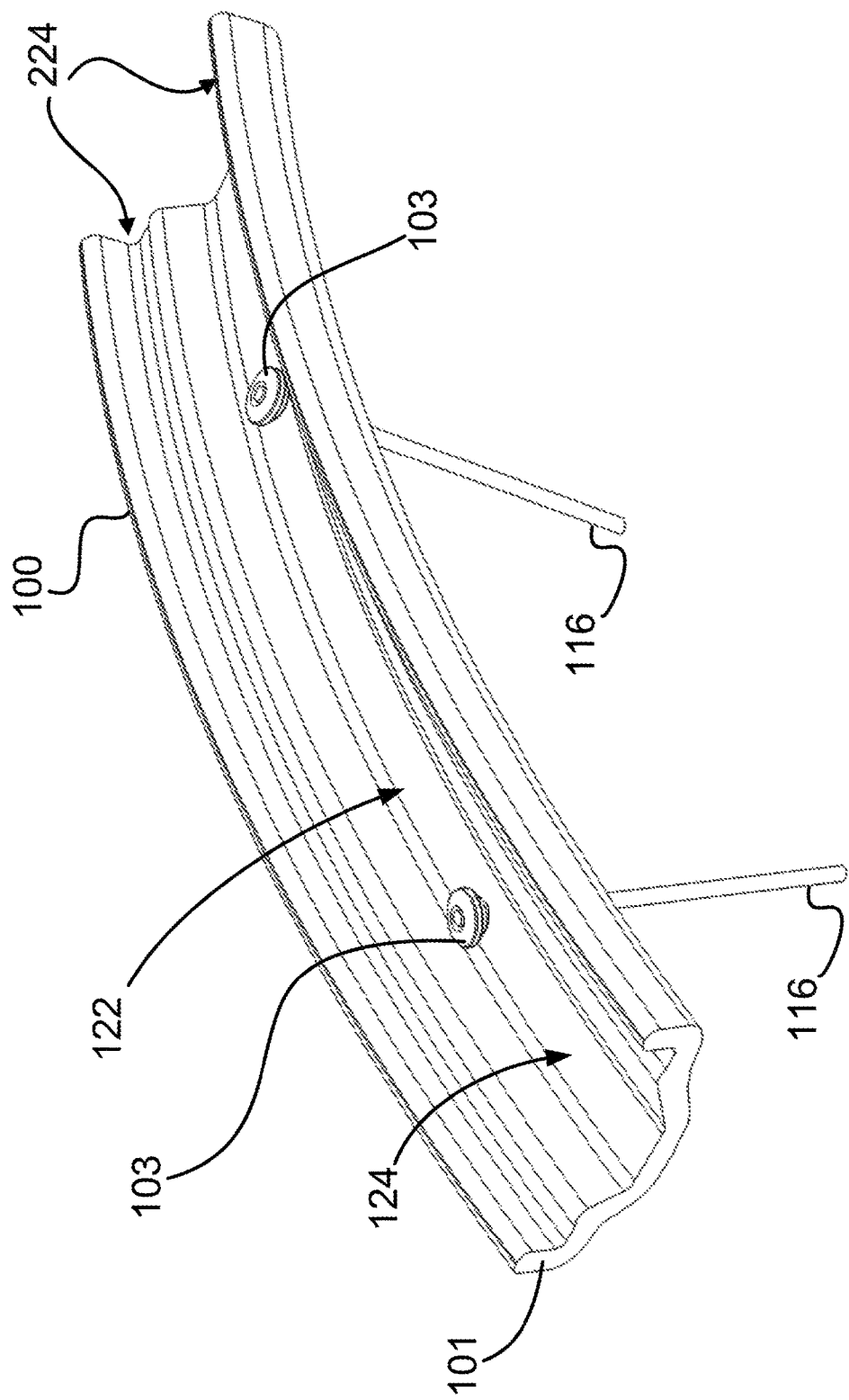
FIG. 2 illustrates a section of a bicycle wheel of FIG. 1, with a tire assembly removed.

FIG. 2 is an enlarged and rotated view of the section 2 indicated in FIG. 1, with the tire 118 and other associated assemblies removed to show the single wall structure of the rim 100 as attached to spokes 116. The spokes 116 pass through a wall 101 of the rim 100 in the spoke receiving portion 122 of the rim 100. The spokes 116 are secured to the rim 100 using spoke attachment members 103, or nipples.

The wall 101 also forms a tire attachment portion 224 configured for attachment to a tire construction. As is illustrated in the embodiment shown in FIG. 2, the tire attachment portion 224 is configured for attachment to clincher tire attachment configurations for tires including beaded interlock attachment.

The wall 101 is formed of a composite material. For example, the wall 101 is formed of a fiber reinforced plastic, epoxy, and/or polymer based material. In an embodiment, the wall 101 is formed of layers of a reinforcement material, such as carbon fiber, embedded in a matrix material, such as an epoxy and/or polymer based material. In an embodiment, the rim is formed absent of metal materials.

In an embodiment, multiple reinforcement materials may be used to form the wall 101. The multiple reinforcement materials may have different material properties. For example, a first reinforcement material used to form the wall may have a finished tenacity value that is lower than a finished tenacity value of a second reinforcement material. A finished tenacity value relates to the tenacity of the material after curing or otherwise forming the finished rim and/or wheel.

Figure 3:
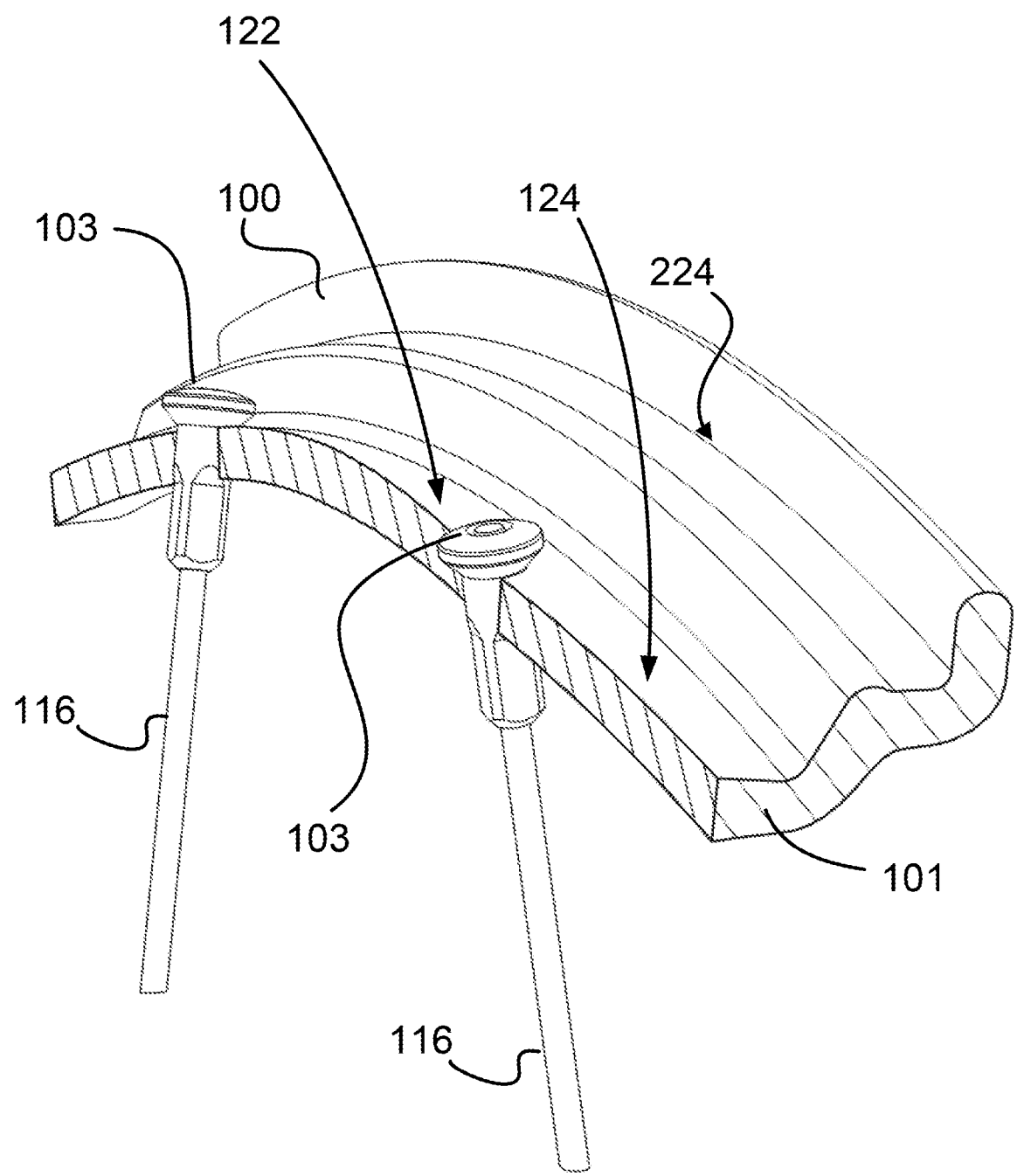
FIG. 3 illustrates a section side view of the section of the wheel of FIG. 2.
Figure 4:
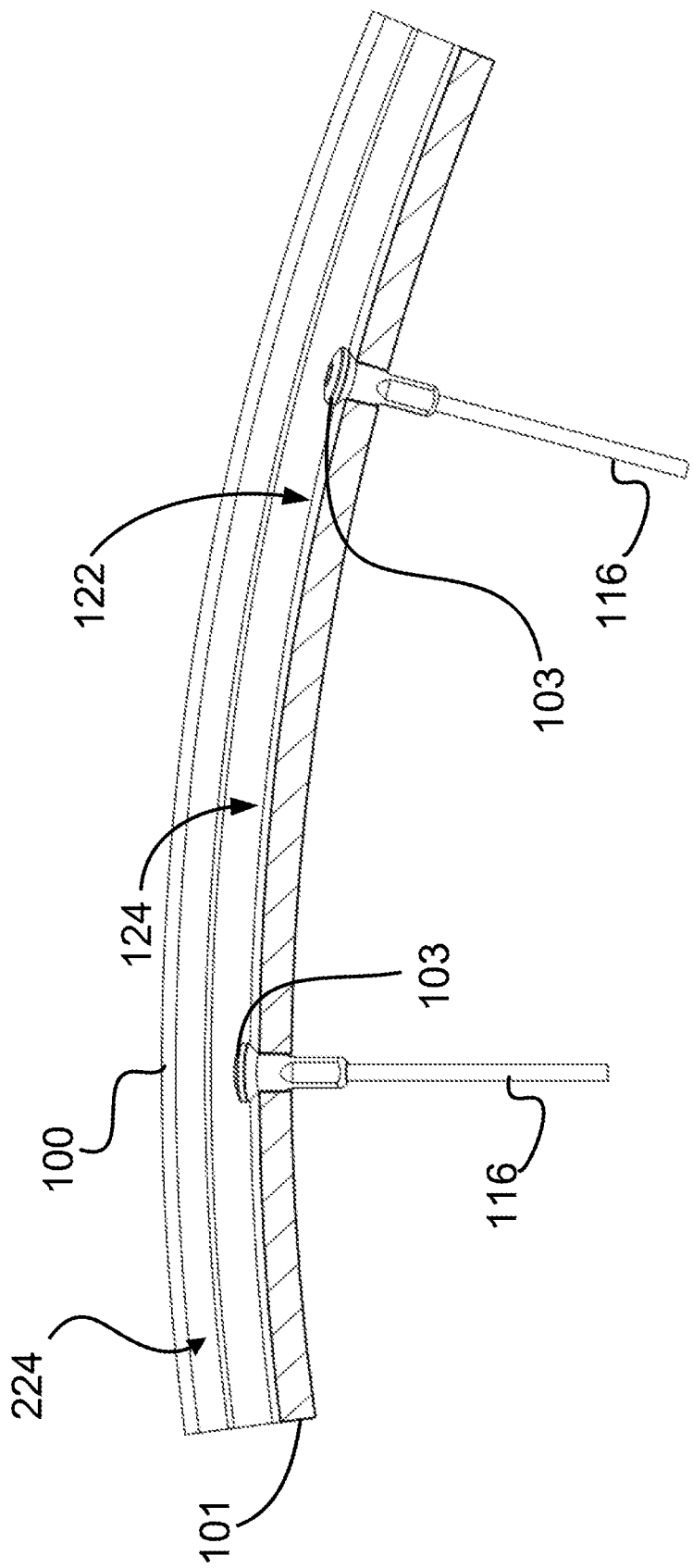

FIGS. 3 and 4 illustrate section 2 of the rim 100 of FIG. 2, in a sectional view taken at a plane forming the center of the spoke receiving recess 124. In an embodiment, this plane is formed at the thickest part of the spoke receiving portion 122 of the wall 101. In FIGS. 3 and 4 spokes 116 are attached to the spoke attachment portion, and load the rim into a tensioned state. In an embodiment, the wall 101 may be deformed from an un-tensioned state to a tensioned state when spokes are attached and tensioned.

FIGS. 5A and 5B illustrate sectional views of the rim 100, taken at differing circumferential locations of indicated section 2 of the rim 100 as shown in FIG. 2. FIG. 5A is shown with a cut section through a spoke attachment vacancy 126, provided for spoke 116 or spoke attachment members 103 to pass therethrough and secure to the rim 100. When compared to the cut section shown in FIG. 5B, which is taken at a different circumferential location about the rim than the view shown in FIG. 5A so as to illustrate the cross sectional shape of the wall 101 absent the spoke attachment vacancy 126. As can be seen from FIGS. 5A and 5B, there are no additional protrusions from an inner radial surface 130 of the wall 101 formed for acceptance of the spoke 116 or spoke attachment members 103. As such, the wall 101 forms a consistent cross sectional shape throughout the circumference of the rim. With no inward protrusions, the wall 101 also provides a consistent inner radial surface 130. A consistent cross sectional shape and/or a consistent inner radial surface 130 may have benefits in the manufacturing process, particularly in mold creation and/or removal of a rim from a mold after a curing or other stabilizing process for the rim materials.

Figure 6:
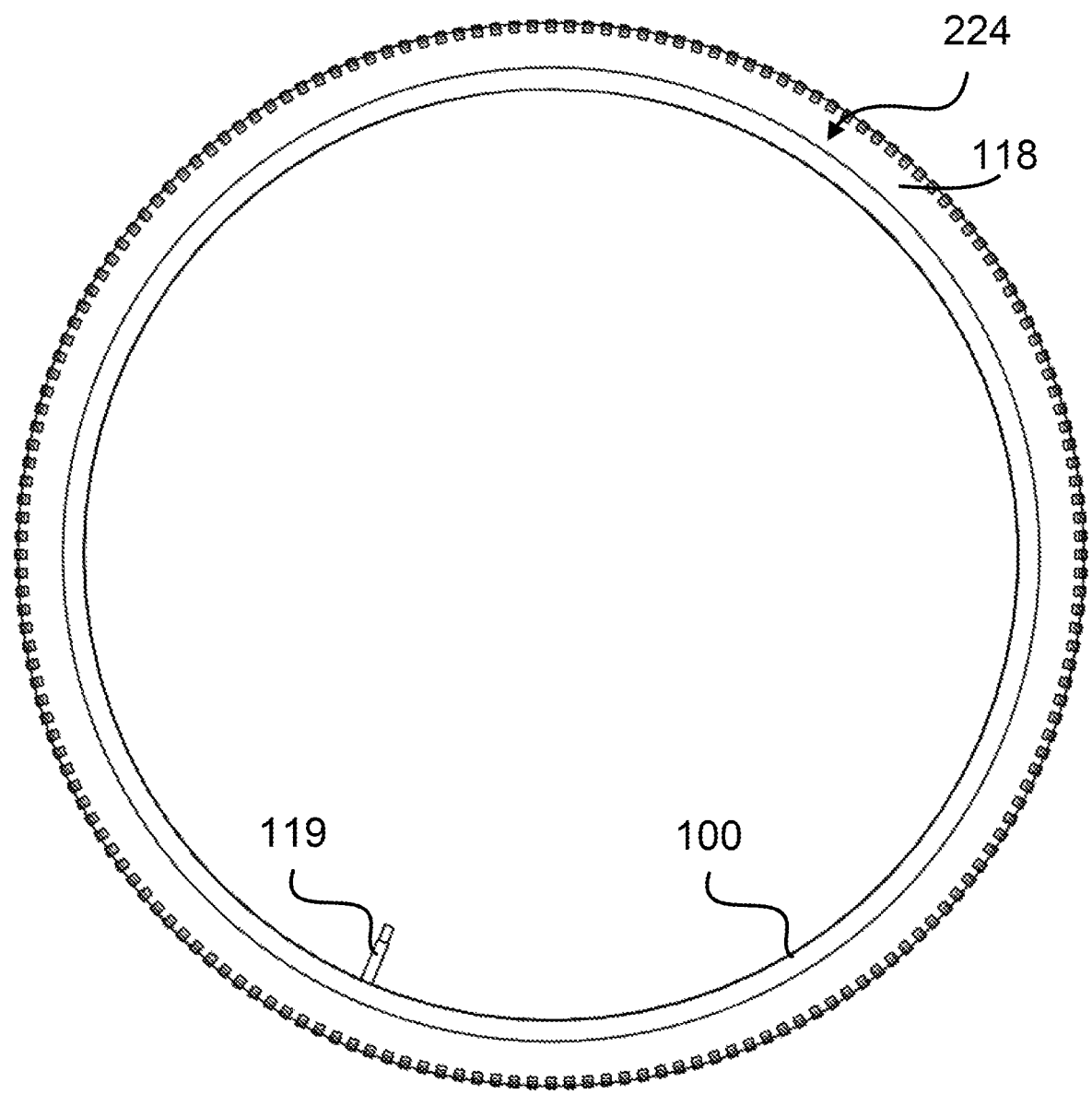
FIG. 6 illustrates a side view of the bicycle wheel of FIG. 1, with the central hub and spokes removed.

FIG. 6 illustrates the rim 100 attached to a tire 118 at the tire attachment portion 224. A control valve 119 is provided to control air in and out of the tire 118. In this view, the spokes and central wheel hub are not shown.

Figure 7A:
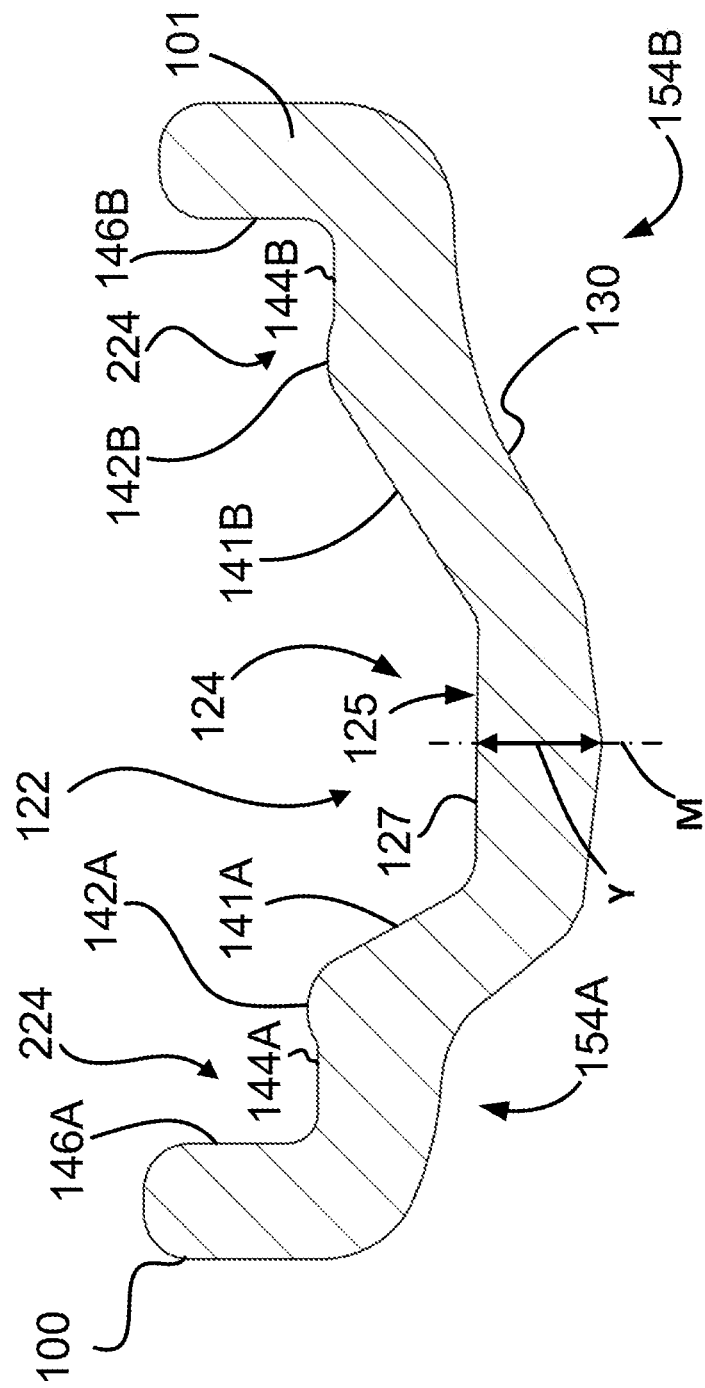
FIGS. 7A-C illustrate an isolated view of the cross sectional shape of the rim of the bicycle wheel of FIG. 1, in an un-tensioned state.
Figure 7B:
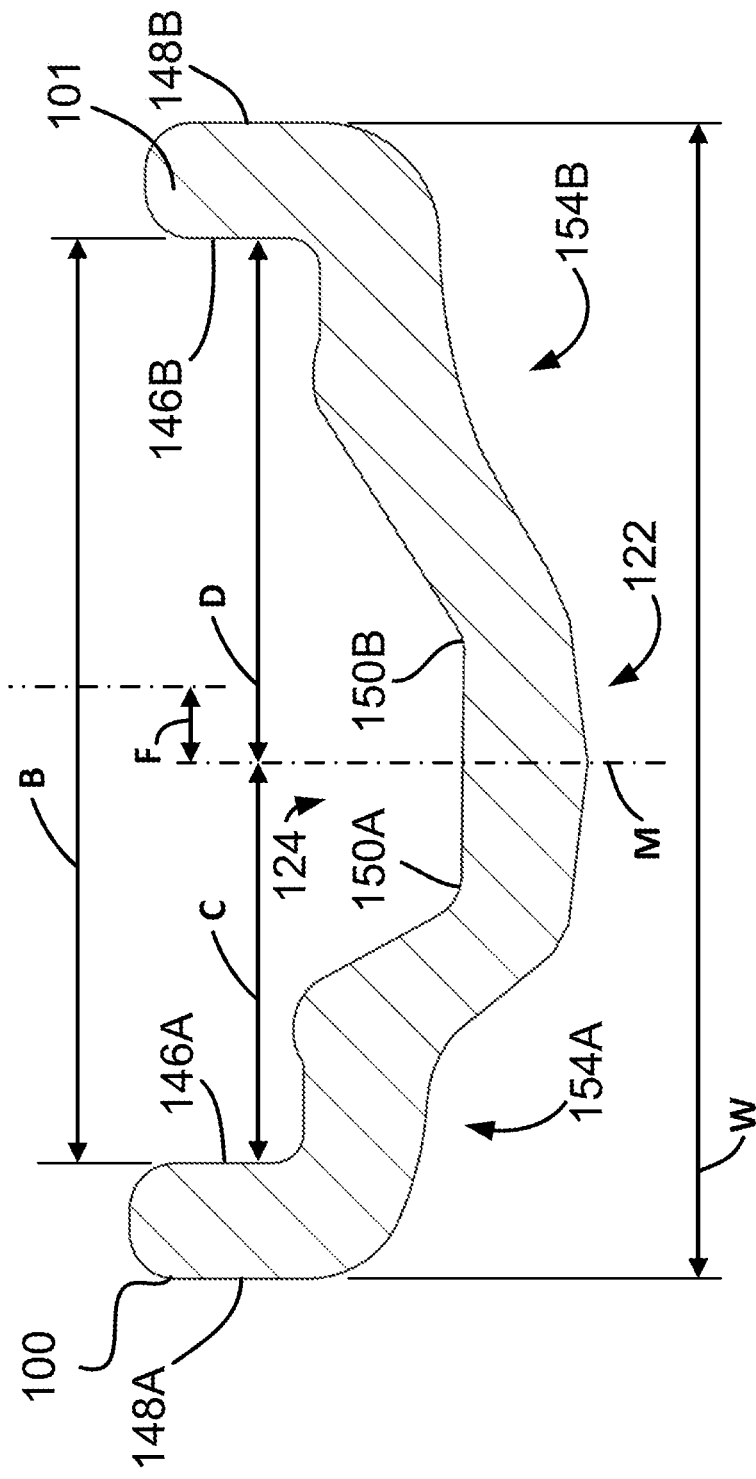
Figure 7C:
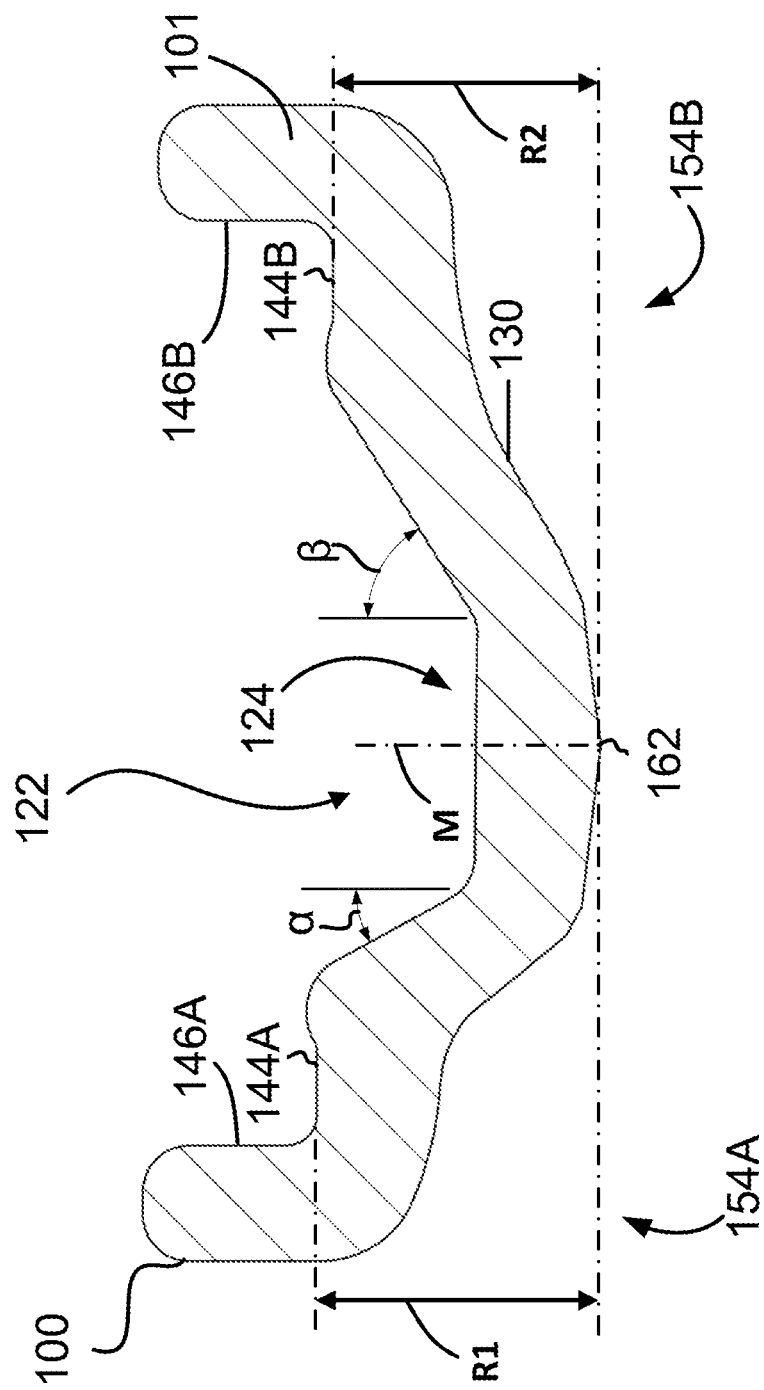

FIGS. 7A-C illustrate a cross section view of the wall 101 in an un-tensioned state. The wall 101 has been formed to include a radially inner spoke attachment portion 122 configured for spoke attachment, and a radially outer tire attachment portion 224 which is configured for attachment to a tire. The spoke attachment portion 122 includes a spoke receiving recess 124, providing a spoke attachment surface 127 sunken to a more radially inner position relative to the tire attachment portion 224.

The spoke receiving recess 124 provides a space for tires including a beaded portion to stage the beaded portion during installation on the rim 100. For example, the beaded portion of the tire may be placed in the spoke receiving recess 124. To complete installation air will be forced into an internal vacancy of the tire. As the air enters the vacancy, and the tire expands, the beads will be forced outward and up bead escape portions, such as ramps 141A-B, to the tire attachment portion 224.

As the bead of the tire escapes the spoke receiving recess 124, the bead moves over bead retention features, such as bead bumps 142A-B to the bead retention portion. The bead retention portion includes the bead bumps 142A-B, bead shelfs 144A-B and bead walls 146A-B.

The bead shelfs 144A-B constrict the movement of the bead in a radially inner direction, while material properties of the bead restrict further movement of the bead in a radial outer direction. The bead walls 146A-B restrict further movement of the bead in an outward axial direction along the rotation axis of the wheel, and the bead bumps 142A-B restrict further movement of the bead in an inner axial direction along the rotation axis of the wheel. A top of the bead bumps 142A-B is more radially outer than the bead shelfs 144A-B. In an embodiment, the bead shelfs 144A-B run parallel to the rotation axis of the wheel, each forming a cylindrical surface about the rotation axis. In an embodiment, the bead walls 146A-B run perpendicular to the rotation axis of the wheel, each forming a disc-like surface about the rotation axis.

The wall 101 of the rim 100 is formed with an overall width W between external wall portions 148A-B. The wall 101 of the rim 100 is formed with an interior width B between bead walls 146A-B. The base of the spoke attachment recess 124, or the spoke attachment surface 127, has a midpoint between bead escape transition points 150A-B. A plane through the midpoint between bead escape transition points 150A-B and perpendicular to the rotation axis of the rim may be used to define a central plane M of the rim 100, separating the rim 100 into a first side 154A and a second side 154B. The wall 101 of the rim 100 is formed such that there is a first distance C from the bead wall 146A of the first side 154A of the rim to the central plane M, and a second distance D from the bead wall 146B of the second side 154B of the rim to the central plane M. In a symmetric width rim the first distance C is equal to the second distance D.

In an embodiment, the first distance C is different than the second distance D. These axial distances C, D may be referenced as axial widths of the respective bead walls 146A, 146B. For example, the first distance C may be shorter than the second distance D. In such a rim, a plane formed at half the interior width B and perpendicular to the rotation axis of the rim is offset a distance from the central plane M. An asymmetric rim width configuration may be useful in providing clearance or space for a collection of sprockets that may be attached to a rear wheel hub, a disc of a braking system for a front wheel hub, or for other reasons. In an embodiment, the axial width C of to the bead wall 146A of the first side 154A may be shorter than the axial width D to the bead wall 146B of the second side 154B.

The rim 100 includes a base section 125 that extends from the spoke receiving surface radially inward towards the axis of rotation of the rim. In an embodiment, the base section 125 has a maximum thickness Y disposed in the central plane M. For example, the thickness Y at the central plane M may be larger than a thickness of any other part of the wall 101 at the base section 125. This increased thickness at the central plane may provide additional strength to resist damage to the rim 100 due to forces imparted on the tire attachment portion 224 of the rim 100.

External forces acting on an asymmetric width rim from use in an aggressive environment are translated through the wall 101 to the spoke attachment portion 122 of the rim 100, and ultimately to the spokes that are attached to the rim 100. The uneven axial widths of the first and second side of the rim cause different moment arms to act on the spoke attachment portion 122. This can be countered by forming the first side 154A and the second side 154B of the rim 100 with particularly crafted un-tensioned stiffnesses. A stiffness of a side of a rim may be varied using several factors. For example, varying wall thickness, using different reinforcement materials, and varying ply angles of reinforcement material may be used to specifically tailor a stiffness of the first side 154A and/or the second side 154B. Also, a preload tension applied to the rim from spokes of various orientations may be used to adapt the stiffness of the sides. Other techniques and combinations of these techniques or others may be used. A stiffness of a side may be determined by applying a known load to a portion of the tire attachment portion 224 on a single side of the rim and measuring a deflection towards the rotation axis of the rim.

In an embodiment, an asymmetric width rim may have a first side with a first axial width and a second side with a second axial width, the first and second axial widths being different. The rim may be formed in a wheel having spokes connecting the rim with a central hub of the wheel. In an assembled and tensioned state, the first side of the rim and the second side of the rim may have a same radial stiffness.

Another technique to address asymmetric rim width is to form a rim in a radially asymmetric configuration when in an un-tensioned state. When tension from spokes is applied, the tension may be configured to draw the rim into a more radially symmetric configuration, thus preloading the rim along the rim's elastic deformation curve.

FIG. 7C illustrates a form of radial asymmetry of the rim 100. As illustrated in FIG. 7C, the rim 100 is formed such that radial distances R1, R2 between an innermost point 162 of the inner radial surface 130 of the rim 100 and the bead shelf 144A of the first side and the bead shelf 144B of the second side are different. Tension configurations of the spokes may be used to cause these radial distances R1, R2 to be substantially the same in a pre-loaded state. These radial distances R1, R2 may be referenced as radial heights of the respective bead shelfs 144A, 144B.

In an embodiment, the wall 101 of the rim 100 is formed such that the radial height R1 of the bead shelf 144A of the first side 154A is larger than the radial height R2 of the bead shelf 144B of the second side 154B.

In an embodiment, the wall 101 of the rim 100 is formed such that the radial height R1 of the bead shelf 144A of the first side 154A is larger than the radial height R2 of the bead shelf 144B of the second side 154B and the axial width C of to the bead wall 146A of the first side 154A is shorter than the axial width D to the bead wall 146B of the second side 154B.

In an asymmetric width rim the first side and the second side may also be different in other ways. For example, an escape angle of respective sides of the spoke receiving recess 124 may vary. In an embodiment, a first escape angle α from the spoke receiving recess 124 of the first side 154A of the rim 100 is different than a second escape angle β from the spoke receiving recess 124 of the second side 154B of the rim 100. For example, when measured from a plane parallel to the central plane M of the rim 100, the first escape angle α from the spoke receiving recess 124 of the first side 154A of the rim 100 may be smaller than the second escape angle β from the spoke receiving recess 124 of the second side 154B of the rim 100. In an embodiment, the first escape angle α from the spoke receiving recess 124 of the first side 154A of the rim 100 is between 25 degrees and 30 degrees, and the second escape angle β from the spoke receiving recess 124 of the second side 154B of the rim 100 is between 55 degrees and 60 degrees. In an embodiment the first escape angle α is approximately half of the second escape angle β. The different escape angles may in the installation of a tire on the rim 100, for example providing a sequenced escape of the tire beads from the spoke receiving recess 124. Also, a rim having different escape angles may have different escape ramp lengths.

In an embodiment, a rim is configured such that the first escape ramp 141A from the spoke receiving recess 124 of the first side 154A of the rim is a different length than the second escape ramp 141B from the spoke receiving recess 124 of the second side 154B of the rim. For example, the first escape ramp 141A from the spoke receiving recess 124 of the first side 154A of the rim is shorter than the second escape ramp 141B from the spoke receiving recess 124 of the second side rim 154B of the.

In an embodiment, a rim is configured such that the first escape ramp 141A from the spoke receiving recess 124 of the first side 154A of the rim and the second escape ramp 141B from the spoke receiving recess 124 of the second side 154B of the rim are smooth surfaces, with consistent angles from a central plane throughout the length of the ramps 141A, 141B from the spoke receiving surface 127 of the spoke receiving recess, to the bead bumps.

Figure 8:
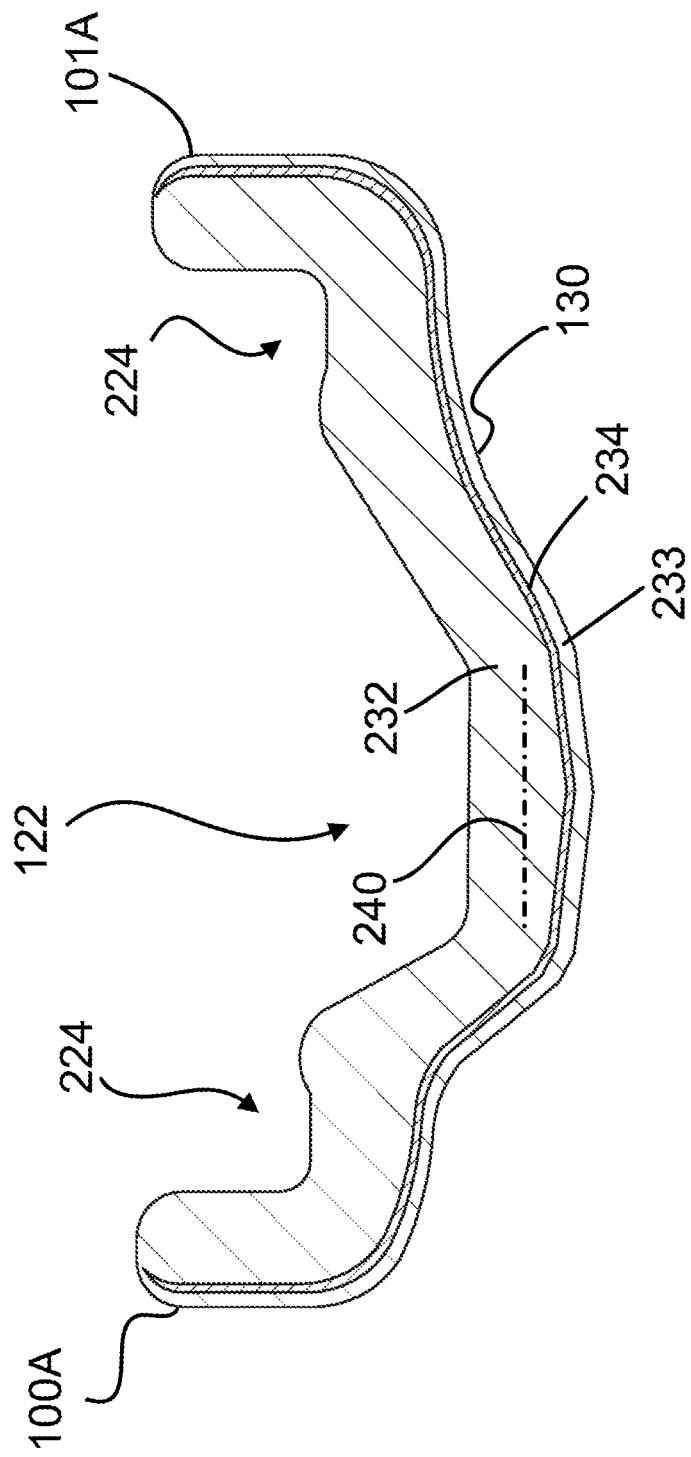
FIG. 8 illustrates a cross sectional shape of an embodiment of the rim of the bicycle wheel of FIG. 1.
Figure 9:
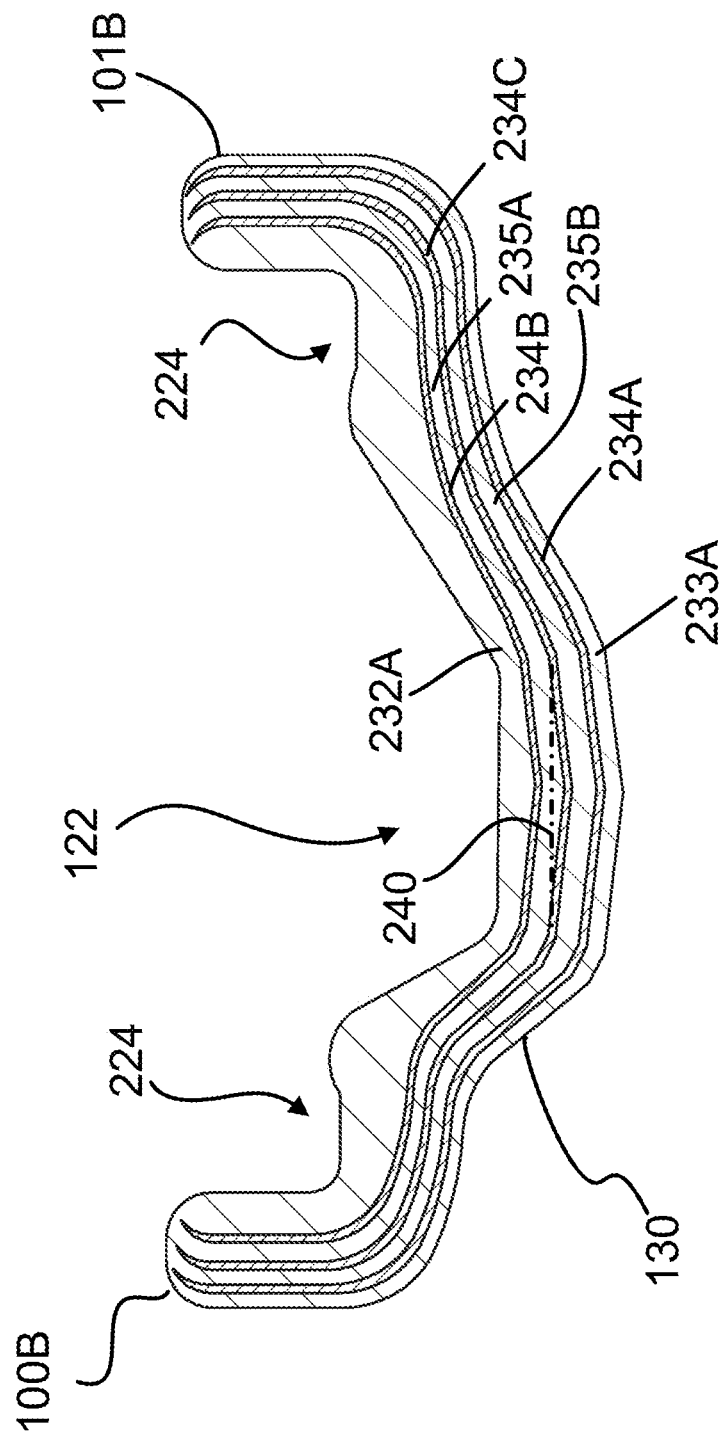
FIG. 9 illustrates a cross sectional shape of an embodiment of the rim of the bicycle wheel of FIG. 1.

FIGS. 8 and 9 illustrate a cross section view of embodiments of a rim 100A, 100B that includes at least two ("2") different reinforcement materials. The rims 100A, 100B may have a wall 101A, 101B formed with the shape and/or construction as described above with respect to the wall 101 of rim 100 of FIG. 2, or other shapes and/or constructions.

In the embodiment shown in FIG. 8, the wall 101A includes a thickness formed of multiple parts. The wall 101A thickness includes a first, or primary, portion 232, a second, or containment, portion 234, and/or a third, or finishing, portion 233. The first portion 232 may be formed of a first, or primary, reinforcement material. The second portion 234 may be formed of a second, or containment, reinforcement material. The third portion 233 may be formed of a third, or finishing, reinforcement material. In an embodiment, the second material is different than the first and the third material. In this embodiment, the first and the third material may be the same or different materials. For example, the first and the third materials may be the same material and the second material may be different from the first and third materials, and embedded within the first and the third material. In an embodiment, the first material and the third material may be formed of a same basic fiber material, such as carbon fiber, but the first and the third material may be formed into different structures or fabric types.

The first material and the second material have different material properties. For example, the second material may have a higher tenacity value than the first material. In an embodiment, the first material is a carbon fiber material and the second material is a material having a higher tenacity value ("high-tenacity material") in the finished rim 100A. For example, the second material may be an aramid or para-aramid synthetic fiber such as Kevlar® produced by DUPONT, an olefin or polyolefin fiber such as Innegra S™ produced by INNEGRA TECHNOLOGIES, an ultra-high-molecular-weight polyethylene fiber such as Spectra® 5900 or S1000 produced by HONEYWELL, or combinations thereof. In an embodiment, the high tenacity material may have a tenacity value of greater than 2000 kN·m/kg, whereas the primary reinforcement material, such as carbon fiber, has a tenacity value lower than 2000 kN·m/kg in the finished rim 100A.

Having a high tenacity material form a portion of the thickness of the rim may provide for a containment portion of the rim thickness. When fibers of the first material break, the portion of the thickness having a high tenacity material may operate to arrest or otherwise impede propagation of the breakage in the first material, thus containing the breakage. It is thought that placement of the containment portion 234 radially inner of the first portion 232, as is shown in FIG. 8, provides an effective configuration for containing breakage propagation of the first material, as forces on the rim 100A typically impact the tire attachment portion, causing breakage propagation in a radially inner direction. In an embodiment, a containment portion 234 may be disposed radially inward of a middle 240 of a thickness of at least the spoke attachment portion 122 of the rim 100A. In an embodiment, a containment portion 234 may be disposed radially inward of a first portion In an embodiment, such as that shown in FIG. 8, the containment portion 234 is covered by a finishing portion 233. The finishing portion 233 may be selected for aesthetic properties, and may not provide significant strength for the rim structure. Thus, the containment portion 234 may be the most radially inner strengthening portion of the rim 100A. In another embodiment, the finishing portion 233 may not be used, and the containment portion may be the most radially inner portion of the rim.

In an embodiment, the second portion 234 forms a layer of the thickness of the rim 100A. The layer may include one or more plies of fabric formed of fibers of the second material. The layer may extend throughout the extent of the wall, as is shown in FIG. 8, or may extend through less than the extent of the wall. For example, the layer of the second portion may extend throughout the spoke retention portion of the rim 100A, but not extend into the tire attachment portion of the rim 100A. In an embodiment, fibers of the second material forming the second portion 234 may form less than 10% of the total mass of fibers in the rim.

FIG. 9 illustrates a cross section of an embodiment of the rim 100B that includes multiple containment portions 233A-C. The wall 101B includes a thickness formed from a first, or primary, reinforcement portion 232A and multiple second, or containment, reinforcement portions 234A-C, as well as an optional third or finishing portion 233A. The wall 101B also includes intermittent portions 235A-B between the containment portions 234A-C. In an embodiment, the intermittent portions 235A-B are formed of a same material as the first portion 232A. For example, the first portion 232A and the intermittent portions 235A-B may be formed of a first material, and the containment portions, 234A-C may be formed of a high tenacity material. In an embodiment, containment portions may exist both above, at, and/or below a middle 240 of a thickness of at least the spoke attachment portion 122 of the rim 100B.

In the embodiment illustrated in FIG. 9, three ("3") containment portions 234A-C are shown. More or fewer containment portions may be used.

As illustrated in the embodiment shown in FIG. 9, the containment portions 234A-C may extend throughout both the spoke attachment portion 122 and the tire attachment portion 224. For example, the containment portions 234A-C may form layers throughout the extent of the wall 101B. In other embodiments, the containment portions may extend through less than an extent of the wall 101B. For example, the multiple layers may primarily extend through the spoke attachment portion 122, without extending into the tire attachment portion 224. In another embodiment having multiple containment portions, some containment portions may extend throughout the extent of the wall, but other containment portions may exist in only the spoke attachment portion 122 or the tire attachment portion 224.

In an embodiment, a rim has a uniform cross section outline throughout the circumference of the rim. In this embodiment, holes may be formed in a wall that forms the rim, however, the holes are formed so as to maintain a consistent outline of a cross sectional shape of the rim. The holes may be formed for spoke attachment, or other reasons such as pneumatic valve installation.

In an embodiment, a bicycle rim is provided. The bicycle rim includes a single wall formed into the bicycle rim, the wall formed of composite material having a spoke attachment portion and a tire attachment portion formed therein, wherein the composite material comprises at least two different fibers used as reinforcement material forming layers of a thickness of the rim.

In an embodiment, a first fiber of the composite material comprises a carbon fiber.

In an embodiment, a second fiber of the composite material forms a containment layer in the wall.

In an embodiment, the containment layer is formed as a continuous layer throughout the thickness of the wall.

In an embodiment, the containment layer is formed of fibers having different material properties than the first fibers.

In an embodiment, the containment layer of second fibers has a higher tenacity value than the portions of the thickness of the rim including the first fibers.

In an embodiment, the second fiber is an aramid based fiber, a para-aramid based fiber, an olefin based fiber, a polyolefin based fiber, a polyethylene fiber, or a ultra-high-molecular-weight polyethylene fiber.

In an embodiment, the containment layer including the second fibers has a tenacity value of greater than 2000 kilo-newton-meters per kilogram (kNm/kg), and the portion of the composite material formed of the first fibers has a tenacity value of less than 2000 kNm/kg.

In an embodiment, the containment layer is disposed radially outer of a middle of the thickness of the rim.

In an embodiment, the wall comprises a plurality of containment layers disposed throughout the thickness of the rim.

In an embodiment, the containment layer is disposed radially inner of a middle of the thickness of the rim.

In an embodiment, the containment layer is disposed radially inner of a middle of the thickness of the rim in the spoke attachment portion of the rim.

In an embodiment, the wall is formed such that in an un-tensioned state a first radial height of a first bead shelf of a first side of the rim is different than a second radial height of a second bead shelf of a second side of the rim.

In an embodiment, the wall is formed such that in an un-tensioned state a first side of the rim has a different stiffness than a second side of the rim.

In an embodiment, the wall is formed absent metallic materials.

In an embodiment, a bicycle rim is provided. The bicycle rim includes a wall formed into the bicycle rim, the wall formed of composite material having a spoke attachment portion and a tire attachment portion formed therein, the composite material formed of layers providing a thickness of the rim, wherein the composite material includes a layer of the interior of the thickness of the rim that is formed of a different material than both layers of the thickness adjacent the interior layer. The composite material may include a carbon fiber. The carbon fiber may be disposed in the adjacent layers. In an embodiment, the wall is formed absent metallic materials.

In an embodiment, a bicycle wheel is provided. The bicycle wheel includes a rim formed from composite materials, the rim formed as a single wall having a spoke attachment portion and a tire attachment portion, wherein the composite material comprises at least two different fibers used as a reinforcement material forming layers of the thickness of the rim. The bicycle wheel also includes a central hub for rotational attachment to a bicycle frame. The bicycle wheel also includes a plurality of spokes extending from the tire attachment portion of the rim and attached to the hub.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale, unless otherwise indicated. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, inventive subject matter may be directed to less than all of the features of any of the disclosed embodiments. It is intended that the foregoing detailed description be regarded as illustrative rather than limiting.

What is claimed is:

1. A bicycle rim, comprising:
   a single wall formed into the bicycle rim, the wall formed of composite material having a spoke attachment portion and a tire attachment portion formed therein,
   wherein the single wall is formed in a radially asymmetric configuration such that in an un-tensioned state a first radial height of a first bead shelf of a first side of the rim is different than a second radial height of a second bead shelf of a second side of the rim, and in a tensioned state the single wall is deformed, wherein attachment of the spokes causes the first radial height to become the same as the second radial height.

2. The bicycle rim of claim 1, wherein the composite material comprises at least two different fibers used as a reinforcement material forming layers of a thickness of the rim, and a first fiber of the composite material comprises a carbon fiber.

3. The bicycle rim of claim 2, wherein the second fiber of the composite material forms a containment layer in the wall.

4. The bicycle rim of claim 3, wherein the containment layer is formed of reinforcement material.

5. The bicycle rim of claim 4, wherein the reinforcement material is formed of fibers having different material properties than the first fibers.

6. The bicycle rim of claim 5, wherein the reinforcement material has a higher tenacity value than the first material.

7. The bicycle rim of claim 6, wherein the reinforcement material is formed of an aramid based fiber, a para-aramid based fiber, an olefin based fiber, a polyolefin based fiber, a polyethylene fiber, or a ultra-high-molecular-weight polyethylene fiber.

8. The bicycle rim of claim 6, wherein the reinforcement material has a tenacity value of greater than 2000 kilonewton-meters per kilogram (kNm/kg), and the portion of the composite material formed of the first fibers has a tenacity value of less than 2000 kNm/kg.

9. The bicycle rim of claim 4, wherein the containment layer is disposed radially outer of a middle of the thickness of the rim.

10. The bicycle rim of claim 9, wherein the wall comprises a plurality of containment layers disposed throughout the thickness of the rim.

11. The bicycle rim of claim 4, wherein the containment layer is disposed radially inner of a middle of the thickness of the rim.

12. The bicycle rim of claim 11, wherein the containment layer is disposed radially inner of a middle of the thickness of the rim in the spoke attachment portion of the rim.

13. The bicycle rim of claim 1, wherein the wall is formed such that in an un-tensioned state a first side of the rim has a different stiffness than a second side of the rim.

14. The bicycle rim of claim 1, wherein the wall is formed absent metallic materials.

15. A bicycle rim, comprising:
a single wall formed into the bicycle rim, the wall formed of composite material having a spoke attachment portion and a tire attachment portion formed therein, the composite material formed of layers providing a thickness of the rim, wherein the wall is formed in a radially asymmetric configuration such that in an un-tensioned state a first radial height of a first bead shelf of a first side of the rim is different than a second radial height of a second bead shelf of a second side of the rim, and in a spoke induced tensioned state the single wall is deformed such that the first radial height matches the second radial height.

16. The bicycle rim of claim 15, wherein the composite material includes a layer of the interior of the thickness of the rim that is formed of a different material than both layers of the thickness adjacent the interior layer and comprises a carbon fiber.

17. The bicycle rim of claim 16, wherein the carbon fiber is disposed in the adjacent layers.

18. The bicycle rim of claim 17, wherein the wall is formed absent metallic materials.

19. A bicycle wheel, comprising:
a rim formed from composite materials, the rim formed as a single wall having a spoke attachment portion and a tire attachment portion, wherein the single wall is formed in a radially asymmetric configuration such that in an un-tensioned state a first radial height of a first bead shelf of a first side of the rim is different than a second radial height of a second bead shelf of a second side of the rim, and in a tensioned state the single wall is deformed such that a difference between the first radial height and the second radial height is reduced;
a central hub for rotational attachment to a bicycle frame; and
a plurality of spokes extending from the tire attachment portion of the rim and attached to the hub.

* * * * *